(12) United States Patent
Lee et al.

(10) Patent No.: US 8,928,639 B2
(45) Date of Patent: Jan. 6, 2015

(54) DISPLAY DEVICE AND DRIVING METHOD THEREOF

(75) Inventors: Min Joo Lee, Seoul (KR); Po-Yun Park, Seoul (KR); Sang Su Han, Yongin-si (KR); Youn Jin Jung, Daejeon (KR); Yong-Jun Choi, Asan-si (KR); Jae-Suk Choi, Uijeongbu-si (KR)

(73) Assignee: Samsung Electronics Co., Ltd. (KR)

( * ) Notice: Subject to any disclaimer, the term of this patent is extended or adjusted under 35 U.S.C. 154(b) by 256 days.

(21) Appl. No.: 13/425,336

(22) Filed: Mar. 20, 2012

(65) Prior Publication Data
US 2013/0106876 A1 May 2, 2013

(30) Foreign Application Priority Data

Oct. 26, 2011 (KR) ........................ 10-2011-0109916

(51) Int. Cl.
*G09G 5/00* (2006.01)
*G06F 13/14* (2006.01)

(52) U.S. Cl.
CPC .............. *G06F 13/14* (2013.01); *Y02B 60/1228* (2013.01); *Y02B 60/1235* (2013.01)
USPC ......................................... 345/204; 345/211

(58) Field of Classification Search
CPC ....... G09G 3/20; G09G 3/3618; G09G 5/005; G09G 5/001; G09G 1/146; G09G 2320/103; G09G 2330/021; G09G 2340/0435; G09G 2310/06; G09G 2320/0247; G09G 3/3611; G09G 3/3648
USPC ......... 345/87–103, 204–214; 348/435.1, 447, 348/478
See application file for complete search history.

(56) References Cited

U.S. PATENT DOCUMENTS

| 5,844,535 | A | * | 12/1998 | Itoh et al. ................... 345/92 |
| 5,859,649 | A | | 1/1999 | Yiu et al. |
| 6,678,834 | B1 | | 1/2004 | Aihara et al. |
| 2003/0020699 | A1 | * | 1/2003 | Nakatani et al. ............. 345/204 |
| 2006/0020835 | A1 | | 1/2006 | Samson et al. |
| 2006/0267972 | A1 | * | 11/2006 | Yi ................... 345/211 |
| 2007/0165127 | A1 | * | 7/2007 | Minami ................... 348/308 |
| 2007/0279407 | A1 | * | 12/2007 | Vasquez et al. ............... 345/213 |
| 2008/0106542 | A1 | * | 5/2008 | Park et al. ................... 345/212 |
| 2008/0143729 | A1 | * | 6/2008 | Wyatt et al. ................... 345/501 |
| 2008/0225062 | A1 | * | 9/2008 | Chang et al. ................ 345/691 |
| 2009/0096769 | A1 | * | 4/2009 | Kim et al. ..................... 345/204 |
| 2010/0066723 | A1 | | 3/2010 | Nam et al. |
| 2011/0187700 | A1 | * | 8/2011 | Kumakawa ................... 345/214 |

FOREIGN PATENT DOCUMENTS

| JP | 2003-316324 A | 7/2003 |
| JP | 3476241 A | 9/2003 |
| JP | 2008-026378 A | 2/2008 |
| JP | 4271414 | 3/2009 |
| KR | 1020010035842 A | 5/2001 |
| KR | 1020040102918 A | 8/2004 |
| KR | 1020060018393 A | 3/2006 |
| KR | 1020100030978 A | 3/2010 |
| KR | 1020110044428 A | 4/2011 |

* cited by examiner

*Primary Examiner* — Hong Zhou
(74) *Attorney, Agent, or Firm* — Innovation Counsel LLP

(57) ABSTRACT

The present invention relates to a display device capable of reducing power consumption and preventing flicker, as well as a driving method thereof. An exemplary display device includes: a display panel configured for display of a still image and a motion picture; a signal controller programmed to transmit control signals for driving the display panel; and a graphic processing unit transmitting input image data to the signal controller. The signal controller includes a frame memory storing the input image data, and the display panel is driven at a first frequency when the motion picture is displayed and alternatingly driven at the first frequency and a second frequency when the still image is displayed, the second frequency being lower than the first frequency.

13 Claims, 8 Drawing Sheets

DISPLAY DEVICE AND DRIVING METHOD THEREOF

CROSS-REFERENCE TO RELATED APPLICATION

This application claims priority to, and the benefit of, Korean Patent Application No. 10-2011-0109916 filed in the Korean Intellectual Property Office on Oct. 26, 2011, the entire contents of which are incorporated herein by reference.

BACKGROUND OF THE INVENTION (a) Field of the Invention

Embodiments of the present invention relate generally to a display device and a driving method thereof, and more particularly to a display device capable of reducing power consumption and preventing flicker, as well as a driving method thereof.

(b) Description of the Related Art

Currently, display devices find wide use in applications such as computer monitors, televisions, mobile phones, and the like. Typical display devices include a cathode ray tube display device, a liquid crystal display, a plasma display device, and the like.

The display device commonly includes a graphic processing unit (GPU), a display panel, and a signal controller. The graphic processing unit transmits image data to the signal controller, and the signal controller generates a control signal for driving the display panel to transmit the control signal together with the image data to the display panel, thereby driving the display device.

Images displayed on the display panel can be categorized as either still images or motion pictures. The display panel typically displays several frames per second and, if image data included in frames are the same as each other, a still image is displayed. Conversely, if image data frames are different from each other, a motion picture is displayed.

In this case, since the signal controller receives the same image data from the graphic processing unit every frame whether a motion picture or a still image is displayed, it can be considered that more power is consumed than is sometimes necessary.

Recently, efforts have been made to reduce display power consumption. In one such effort, the image data of a still image is stored in a frame memory which provides the image to the display panel during the duration in which the still image is to be displayed. This method is called Panel Self Refresh (PSR) mode, and since the image data does not need to be received from the graphic processing unit while displaying the still image, the graphic processing unit is deactivated, thereby reducing power consumption.

However, PSR mode has drawbacks. In particular, the addition of a frame memory increases power consumption.

The above information disclosed in this Background section is only for enhancement of understanding of the background of the invention and therefore it may contain information not in the prior art.

SUMMARY OF THE INVENTION

Embodiments of the present invention provide a display device having the advantages of reduced power consumption and better flicker prevention.

An exemplary embodiment of the present invention provides a display device including: a display panel configured for display of a still image and a motion picture; a signal controller programmed to transmit control signals for driving the display panel; and a graphic processing unit transmitting input image data to the signal controller. The signal controller includes a frame memory storing the input image data, and the display panel is driven at a first frequency when the motion picture is displayed and alternatingly driven at the first frequency and a second frequency when the still image is displayed, the second frequency being lower than the first frequency.

The graphic processing unit may be programmed to transmit a still image start signal and a still image end signal to the signal controller.

The signal controller may be configured to store the input image data in the frame memory and to interrupt transmission of the input image data to the display panel when the still image start signal is received, and be configured to resume transmission of the input image data when the still image end signal is received.

The signal controller may be configured to output image data stored in the frame memory to the display panel at the first frequency and the second frequency in alternating manner when the still image start signal is received, and to output the input image data to the display panel at the first frequency when the still image end signal is received.

The signal controller may further include a signal receiving unit for receiving the input image data from the graphic processing unit; and a driving frequency selecting unit configured to alternately select the first frequency and the second frequency when the still image is displayed, and to select the first frequency when the motion picture is displayed.

The signal controller can be configured to transmit first and second clock signals so as to control a timing of display of images on the display panel, and when the display panel is driven at the second frequency, the second clock signal may have a clock speed lower than that of the first clock signal when the display panel is driven at the first frequency.

A length of a second vertical blank period when the display panel is driven at the second frequency may be larger than a length of a first vertical blank period when the display panel is driven at the first frequency.

The signal controller may provide a dummy data enable signal during the second vertical blank period.

One of the dummy data enable signals can be provided during each frame period of the second vertical blank period.

The dummy data enable signals may not be provided during at least one frame period of the second vertical blank period.

Another exemplary embodiment of the present invention provides a driving method of a display device, including: (a) transmitting input image data to a signal controller from a graphic processing unit; (b) applying a still image start signal; (c) driving a display panel at a first frequency and a second frequency in alternating manner; (d) applying a still image end signal; and (e) driving the display panel at the first frequency, in which the second frequency is lower than the first frequency.

After (a), the input image data may be stored in the frame memory and the transmitting may be suspended when the still image start signal is applied. The transmitting may be resumed when the still image end signal is applied.

In the step (c), the image data stored in the frame memory may be output to the display panel at the first frequency and the second frequency in alternating manner once the still image start signal is applied. In (e), the input image data may be output to the display panel at the first frequency once the still image end signal is applied.

The display panel may be configured to display a still image and a motion picture, and the display panel may be driven at the first frequency and the second frequency in alternating manner when the still image is displayed, and may be driven at the first frequency when the motion picture is displayed.

In (c), the signal controller may be configured to transmit first and second clock signals so as to control a timing of display of images on the display panel, and when the display panel is driven at the second frequency, the second clock signal may have a clock speed lower than that of the first clock signal when the display panel is driven at the first frequency.

In (c), a length of a second vertical blank period when the display panel is driven at the second frequency may be larger than a length of a first vertical blank period when the display panel is driven at the first frequency.

In (c), a dummy data enable signal may be applied during the second vertical blank period.

One of the dummy data enable signals may be provided during each frame period of the second vertical blank period.

The dummy data enable signals may not be provided during at least one frame period of the second vertical blank period. According to the exemplary embodiments of the present invention, the display panel is alternately driven at the first frequency and the second frequency lower than the first frequency when the still image is displayed, such that it is possible to reduce power consumption and prevent flicker and afterimage due to the reduction in driving frequency.

Further, the dummy data enable signals are provided in alternating polarities during the vertical blank period when the display panel is driven at the second frequency, such that it is possible to prevent deterioration in a liquid crystal.

Further, some frame periods of the second vertical blank period may not have a dummy data enable signal applied to them (i.e., some frame periods are "blank" without any signal applied), such that it is possible to reduce the overall power consumption.

DETAILED DESCRIPTION OF THE EMBODIMENTS

Figure 1:
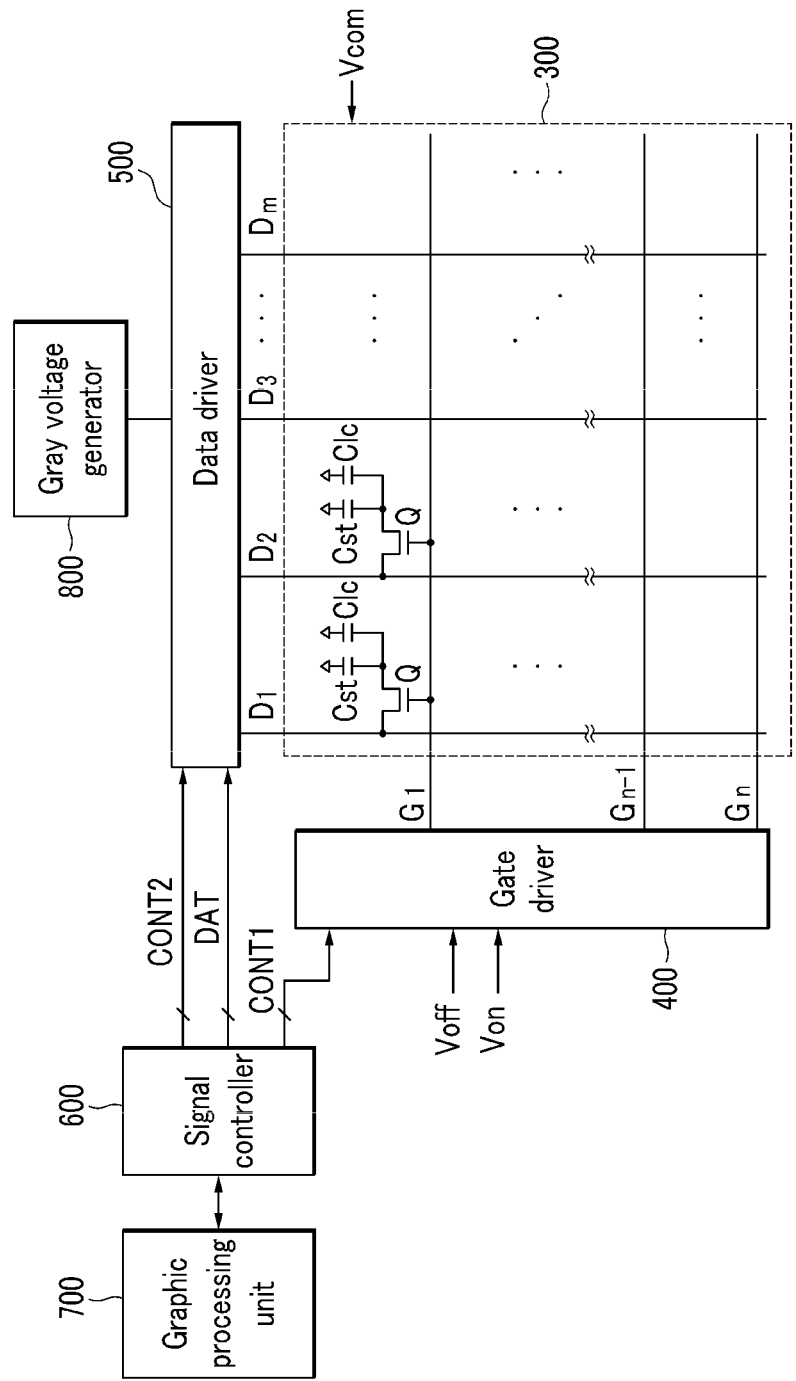
FIG. 1 is a block diagram of a display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a display device according to an exemplary embodiment of the present invention will be described below with reference to the accompanying drawings.

FIG. 1 is a block diagram of a display device according to an exemplary embodiment of the present invention.

As shown in FIG. 1, a display device according to this exemplary embodiment of the present invention includes a display panel 300 displaying an image, a signal controller 600 controlling signals for driving the display panel 300, and a graphic processing unit 700 transmitting input image data to the signal controller 600.

The display panel 300 may receive image data DAT from the signal controller 600 to display a still image or a motion picture. If a plurality of sequential frames have the same image data DAT, a still image is displayed. Conversely, if the plurality of sequential frames have different image data DAT, a motion picture is displayed.

The display panel 300 includes a plurality of gate lines G1-Gn and a plurality of data lines D1-Dm, the plurality of gate lines G1-Gn extend in a horizontal direction, and the plurality of data lines D1-Dm cross the plurality of gate lines G1-Gn to extend in a vertical direction.

One gate line G1-Gn and one data line D1-Dm are connected with one pixel, and a switching element Q connected with the gate line G1-Gn and the data line D1-Dm is included in the pixel. A control terminal of the switching element Q is connected to the gate line G1-Gn, an input terminal thereof is connected with the data line D1-Dm, and an output terminal is connected to a liquid crystal capacitor $C_{LC}$ and a storage capacitor $C_{ST}$.

The display panel 300 of FIG. 1 is shown as a liquid crystal panel, but the present invention is not limited thereto and may be used in conjunction with any suitable display panel.

The signal controller 600 processes input image data and control signals thereof and operates the liquid crystal panel 300 in response to the input image data received from the graphic processing unit 700 and the control signals thereof. For example, as is known, a vertical synchronization signal Vsync, a horizontal synchronization signal Hsync, a main clock signal MCLK, a data enable signal DE, and the like are received. From these signals, the signal controller 600 generates and outputs a gate control signal CONT1 and a data control signal CONT2.

The gate control signal CONT1 includes a vertical synchronization start signal STV instructing an output start of a gate-on pulse (e.g., a high portion of a gate signal GS), a gate clock signal CPV controlling an output time of the gate-on pulse, and the like.

The data control signal CONT2 includes a horizontal synchronization start signal STH instructing an input start of the image data DAT, a load signal TP instructing application of the corresponding data voltage to the data lines D1-Dm, and the like.

The graphic processing unit 700 transmits the input image data to the signal controller 600. When the display panel 300 displays a motion picture, the graphic processing unit 700 transmits the input image data to the signal controller 600 every frame. When the display panel 300 displays a still image, since the signal controller 600 stores the input image data received from the graphic processing unit 700, the graphic processing unit 700 does not transmit the input image data to the signal controller 600. That is, when the display panel 300 displays the still image, the graphic processing unit 700 is deactivated, and the display panel 300 instead receives image frames from the signal controller 600.

The graphic processing unit 700 transmits a still image start signal to the signal controller 600 when a still image is transmitted, i.e. at the time at which a still image is to be displayed. Further, the graphic processing unit 700 transmits a still image end signal to the signal controller 600 when a motion picture is transmitted, i.e. at the time at which a motion picture is to be displayed.

The display device according to the exemplary embodiment of the present invention may further include a gate driver 400 driving the gate lines G1-Gn and a data driver 500 driving the data lines D1-Dm.

The plurality of gate lines G1-Gn of the display panel 300 are connected to the gate driver 400 and the gate driver 400 alternately applies gate-on voltage Von and gate-off voltage Voff to the gate lines G1-Gn according to the gate control signal CONT1 applied from the signal controller 600.

The plurality of data lines D1-Dm of the display panel 300 are connected to the data driver 500 and the data driver 500 receives the data control signal CONT2 and the image data DAT from the signal controller 600. In known manner, the data driver 500 converts the image data DAT into data voltages by using gray voltages generated from a gray voltage generator 800, and transfers the converted data voltage to the data lines D1-Dm.

Next, a signal controller of a display device according to an exemplary embodiment of the present invention will be described.

Figure 2:
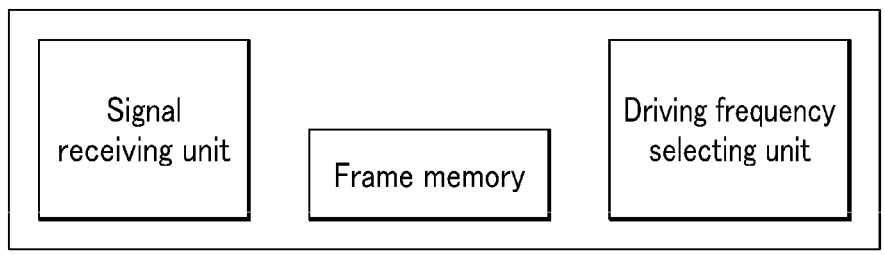
FIG. 2 is a block diagram illustrating a signal controller of the display device according to an exemplary embodiment of the present invention.

FIG. 2 is a block diagram illustrating a signal controller of a display device according to an exemplary embodiment of the present invention.

The signal controller 600 may include a signal receiving unit 610 receiving various signals from the graphic processing unit 700, a frame memory 640 storing the input image data, and a driving frequency selecting unit 650 alternately selecting a first frequency and a second frequency when a still image is displayed, and selecting only the first frequency when a motion picture is displayed.

The signal receiving unit 610 receives the input image data, the still image start signal, and the still image end signal from the graphic processing unit 700. Although not shown, the signal receiving unit 610 is connected to the graphic processing unit 700 through a main link and a sub link. The signal receiving unit 610 receives the input image data from the graphic processing unit 700 through the main link. Further, the signal receiving unit 610 receives the still image start signal and the still image end signal from the graphic processing unit 700 through the sub link, and transmits a signal for notifying a driving state of the display panel 300 back to the graphic processing unit 700.

The frame memory 640 receives and stores the input image data from the signal receiving unit 610. When the display panel displays a motion picture, the frame memory 640 is not used. When the display panel displays a still image, the input image data is stored in the frame memory 640 and the image data stored in the frame memory 640 is outputted to the display panel 300.

The driving frequency selecting unit 650 alternately selects the first frequency and the second frequency when the display panel displays a still image, and selects only the first frequency when the display panel displays a motion picture. When the still image is displayed, first, the driving frequency selecting unit 650 receives stored image data from the frame memory 640 for m frames (m is any natural number) to output the stored image data to the display panel 300 at the first frequency. Subsequently, the driving frequency selecting unit 650 outputs the stored image data to the display panel 300 at the second frequency for n frames (n is any natural number). When a motion picture is displayed, the driving frequency selecting unit 650 receives the input image data from the signal receiving unit 610 to output the received input image data to the display panel 300 at the first frequency.

In this case, the second frequency has a value lower than the first frequency.

For example, the first frequency may be 60 Hz, which means that 60 frames are reproduced per second and displayed on the screen. Further, the second frequency may be 10 Hz, which means that 10 frames are reproduced per second and displayed on the screen.

Figure 3:
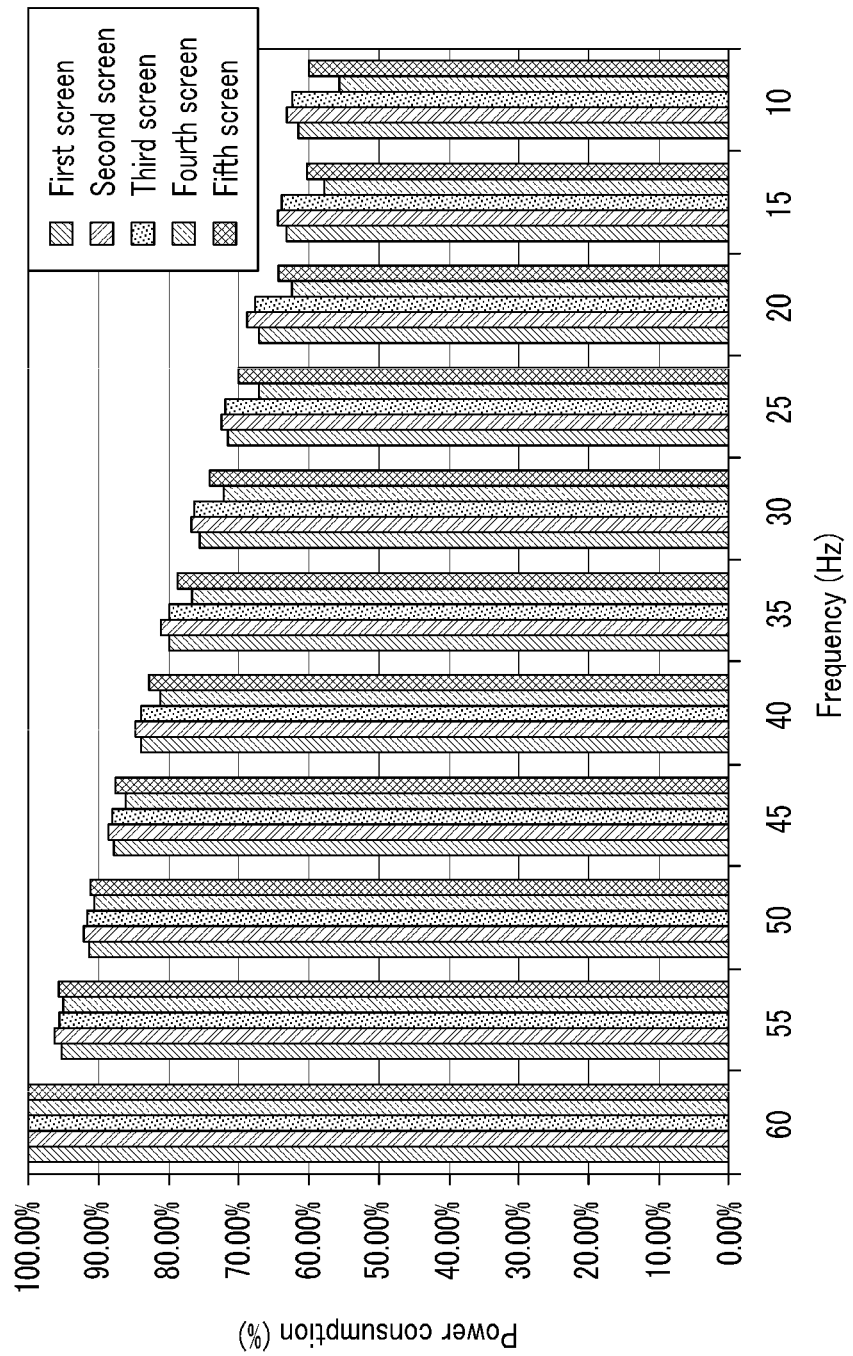
FIG. 3 is a graph illustrating power consumption according to a driving frequency.

In this case, referring to FIG. 3, power consumption according to the driving frequencies of the display panel is verified.

FIG. 3 is a graph illustrating power consumption according to driving frequency. In more detail, the power consumption at a driving frequency of 60 Hz is set at 100% and five different screens are driven at 60 Hz to 10 Hz. A ratio of relative power consumption to the power consumption at 60 Hz is shown. In the five different screens, the first screen is a white screen, the second screen is a black screen, the third screen and the fourth screen are screens displaying regions of different color, and the fifth screen is a windows wallpaper.

Since the power consumption when the display panel is driven at 10 Hz is about 60%, the power consumption is reduced by about 40% as compared with the case where the display panel is driven at 60 Hz. Accordingly, the ratio of driving frequency when a still image is displayed to driving frequency when a motion picture is displayed is set at or below a predetermined value, thereby reducing power consumption.

When a motion picture is displayed at reduced driving frequency, there is a risk of making the motion look unnatural, but this is not a problem with still images.

However, when a still image is continuously driven at a low driving frequency, flicker increases. Accordingly, in an exemplary embodiment of the present invention, the display panel is alternately driven at the first frequency and the second frequency when the still image is displayed, thereby both reducing power consumption and reducing flicker. For example, when the still image is displayed, the display panel may be driven at 60 Hz for 10 frames, driven at 10 Hz for the next 10 frames, driven at 60 Hz for the 10 frames after that, driven at 10 Hz for the 10 frames after that, and so on.

As described above, the display panel is driven at the first frequency for the first m frames, driven at the second frequency for the next n frames, and driven by repeating this pattern as described above, but the present invention is not limited thereto. The display panel may be driven at the second frequency for the first m frames, driven at the first frequency for the next n frames, and driven by repeating this pattern as described above. Further, the m frames and the n frames may be set to the same value or may also be set to different values.

The signal controller 600 may change the driving frequency from the first frequency to the second frequency by reducing the clock signal that controls the timing of the display panel 300. For example, the speed of the clock signal may be changed by 1/6 in order to drive the display panel 300 by changing the driving frequency from 60 Hz to 10 Hz.

One approach to accomplish this is to implement two clock signals, both controlling the timing of the display panel 300. The signal controller 600 sets the clock speed of the first clock signal at a higher speed when the display panel 300 is to be driven at the first (higher) frequency, and sets the clock speed of the second clock signal at a lower speed when the display panel 300 is to be driven at the second (lower) frequency. Accordingly, a length of one second clock signal is longer than a length of one first clock signal.

As another method, the signal controller 600 may increase a length of a vertical blank period in order to drive the display panel 300 by changing the driving frequency from the first frequency to the second frequency. For example, the length of the vertical blank period may be changed so as to correspond to the length of five frames in order to drive the display panel 300 by changing the driving frequency from 60 Hz to 10 Hz.

That is, the signal controller 600 may set a length of a second vertical blank period, which is the vertical blank period when the display panel 300 is driven at the second frequency, to be larger than the length of a first vertical blank period, which is the vertical blank period when the display panel 300 is driven at the first frequency.

Hereinafter, a driving method of a display device according to an exemplary embodiment of the present invention will be described below.

Figure 4:
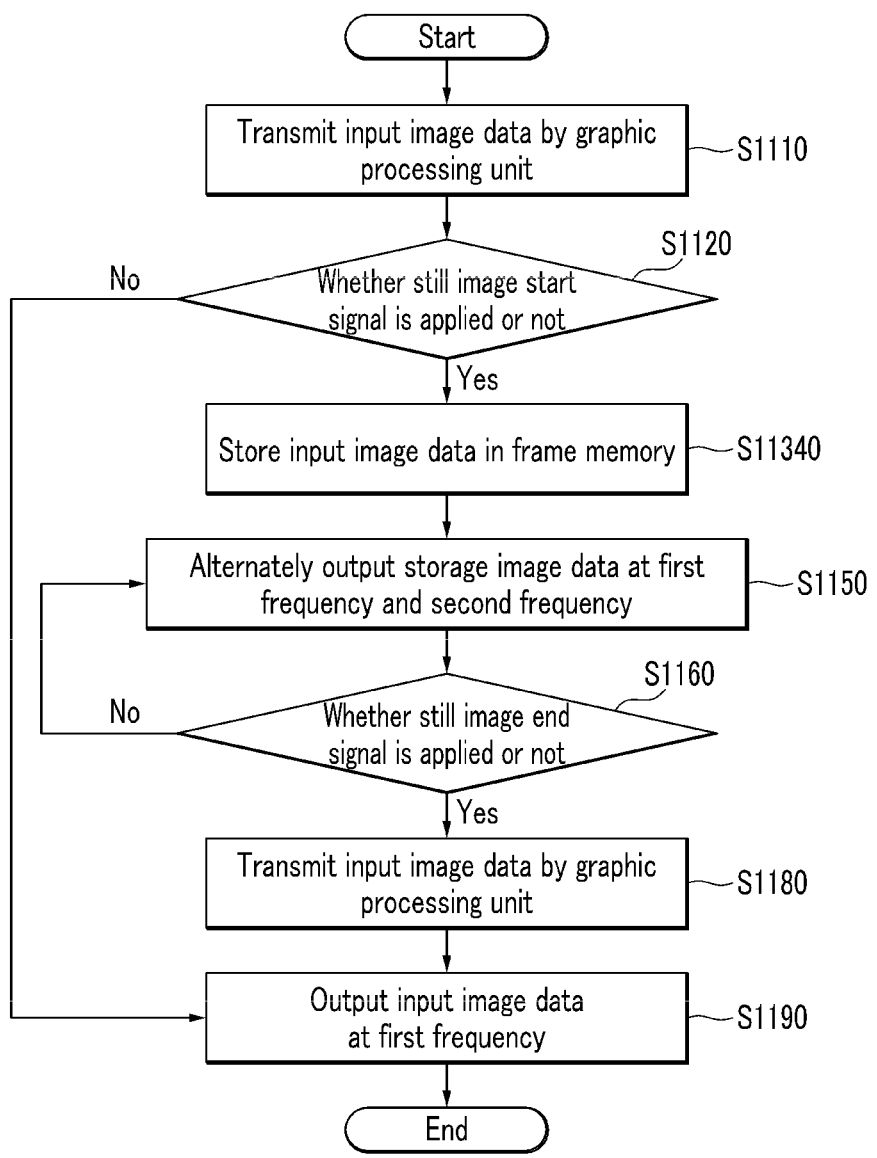
FIG. 4 is a flowchart illustrating a driving method of the display device according to an exemplary embodiment of the present invention.
Figure 5:
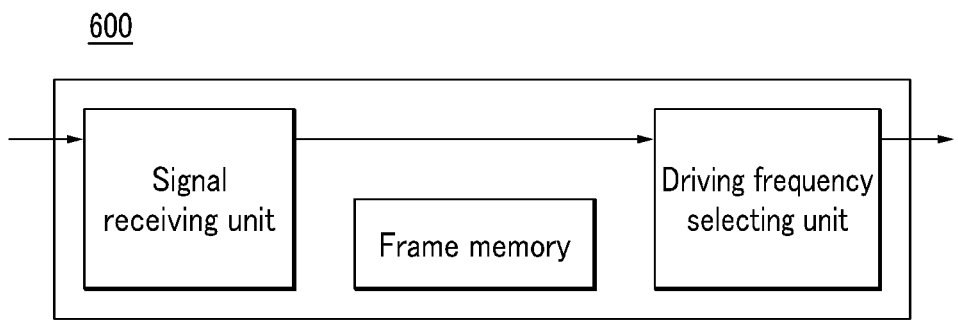
FIGS. 5 to 7 are block diagrams of the signal controller illustrating the driving method of the display device according to an exemplary embodiment of the present invention for each step in sequence.
Figure 6:
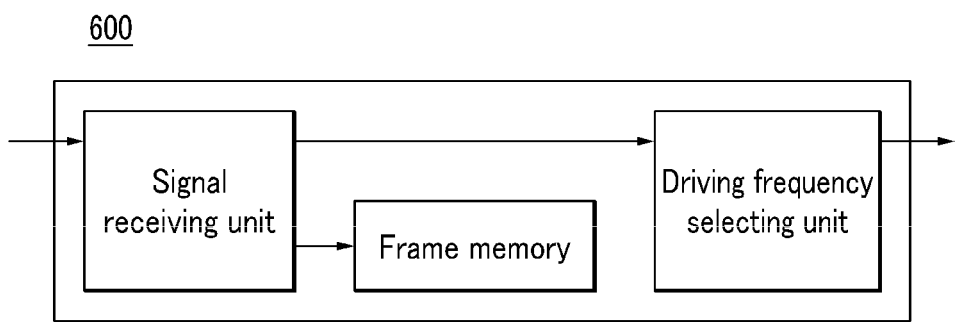
Figure 7:
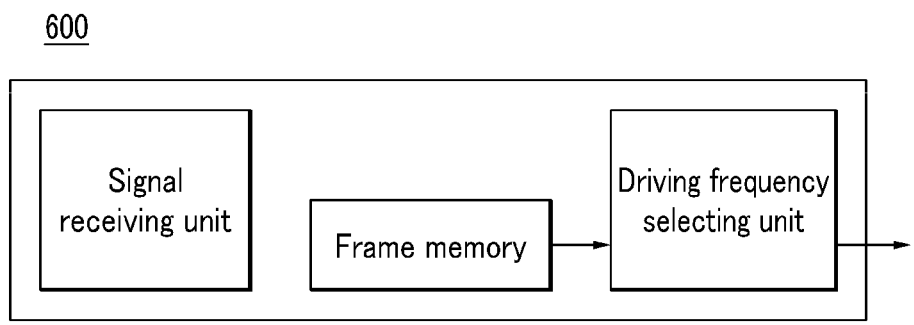

FIG. 4 is a flowchart illustrating a driving method of the display device according to an exemplary embodiment of the present invention, and FIGS. 5 to 7 are block diagrams of the signal controller illustrating the driving method of the display device according to an exemplary embodiment of the present invention for each step in sequence.

First, as shown in FIG. 5, the graphic processing unit transmits the input image data to the signal receiving unit 610 of the signal controller 600 (S1110).

The signal controller 600 determines whether or not the still image start signal is applied to the signal receiving unit (S1120) and if the still image start signal is not applied, the input image data is outputted to the display panel (S1190).

If the still image start signal is applied, as shown in FIG. 6, the input image data is stored in the frame memory 640 (S1140).

Subsequently, as shown in FIG. 7, the graphic processing unit is inactivated so that the graphic processing unit does not transmit, or suspends transmission of, the input image data, and the image data stored in the frame memory 640 is outputted (S1150). If the still image start signal is applied, the driving frequency selecting unit 650 alternately selects the first frequency and the second frequency to alternately output the storage image data to the display panel at the first frequency and the second frequency. In this case, the display panel displays a still image which is alternately and repetitively driven at the first frequency and the second frequency.

In further detail, if the still image start signal is applied, first, the driving frequency selecting unit 650 receives the stored image data from the frame memory 640 for m frames (m is any natural number) and outputs the received storage image data to the display panel 300 at the first frequency. Subsequently, the driving frequency selecting unit 650 outputs the stored image data to the display panel 300 at the second frequency for n frames (n is any natural number).

In this case, the second frequency has a value lower than the first frequency.

For example, after the still image start signal is applied, the stored image data may be outputted at 60 Hz for the first 10 frames, outputted at 10 Hz for the next 10 frames, outputted at 60 Hz for the next 10 frames, outputted at 10 Hz for the next 10 frames, etc.

As another example, after the still image start signal is applied, the stored image data may be outputted at 10 Hz for the first 10 frames, outputted at 60 Hz for the next 10 frames, outputted at 10 Hz for the next 10 frames, outputted at 60 Hz for the next 10 frames, etc. That is, the display panel may be driven at the second frequency for the first m frames, driven at the first frequency for the next n frames, and driven by repeating this pattern as described above.

As yet another example, after the still image start signal is applied, the storage image data may be outputted at 60 Hz for the first 10 frames, outputted at 10 Hz for the next 20 frames, outputted at 60 Hz for the next 10 frames, outputted at 10 Hz for the next 20 frames, and so on. That is, the m frames and the n frames may be set to different values. That is, any values of m and n are contemplated, whether the same or different.

As above, the signal controller 600 of the display device according to the exemplary embodiment of the present invention may change the driving frequency of the display panel 300 from the first frequency to the second frequency, by changing the speed of a clock signal. That is, the signal controller 600 may set the clock speed of a second clock signal (which is the clock signal when the display panel 300 is driven at the second frequency) to a value lower than that of a first clock signal (which is the clock signal when the display panel 300 is driven at the first frequency). Accordingly, a length of one second clock signal is longer than a length of one first clock signal.

As another method, the signal controller 600 of the display device according to the exemplary embodiment of the present invention may increase a length of a vertical blank period in order to drive the display panel 300 by changing the driving frequency from the first frequency to the second frequency. That is, the signal controller 600 may set a length of a second vertical blank period (which is the vertical blank period when the display panel 300 is driven at the second frequency) to a value larger than the length of a first vertical blank period (which is the vertical blank period when the display panel 300 is driven at the first frequency).

Subsequently, it is determined whether or not the still image end signal is applied (S1160) and then, if the still image end signal is not applied, the stored image data continues to be alternately outputted at the first frequency and the second frequency (S1150).

If the still image end signal is applied, as shown in FIG. 5, the graphic processing unit is activated again so that transmission of the input image data is resumed (S1180).

If the still image end signal is applied, the driving frequency selecting unit 650 selects the first frequency, so as to output the input image data to the display panel at the first frequency (S1190). In this case, the display panel displays the motion picture and is driven at the first frequency.

As described above, the signal controller of the display device according to the exemplary embodiment of the present invention may increase the length of the vertical blank period in order to change the driving frequency of the display panel from the first frequency to the second frequency. One such embodiment implementing this approach will now be described below with reference to drawings.

Figure 8:
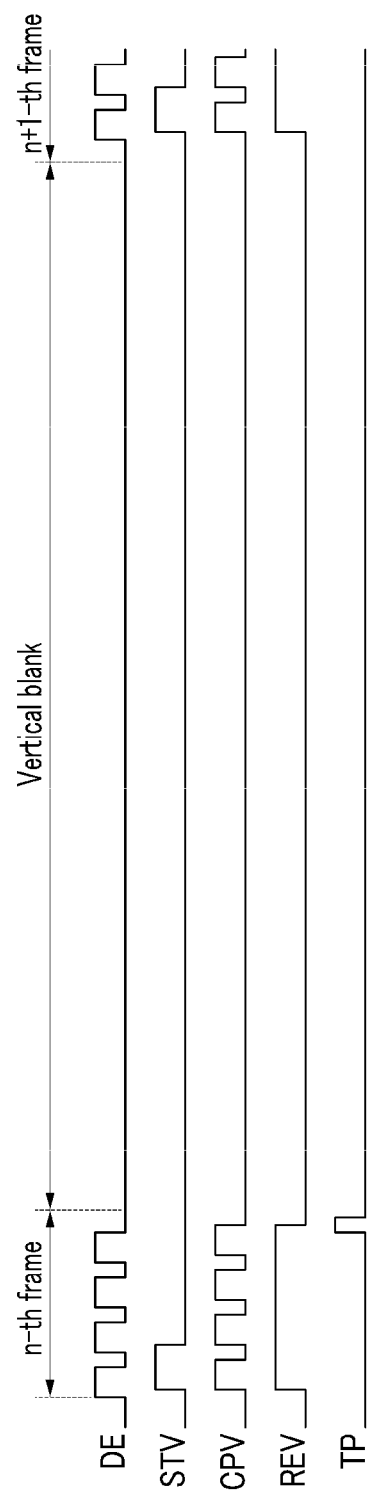
FIG. 8 is a diagram illustrating control signals of a display device according to an exemplary embodiment of the present invention.

FIG. 8 is a diagram illustrating control signals of a display device according to an exemplary embodiment of the present invention.

A data enable signal DE is applied in the n-th frame and as a result, a vertical synchronization start signal STV, a gate clock signal CPV, a polarity inversion signal REV, and a load signal TP are applied, respectively.

In FIG. 8, four data enable signals DE are applied in the n-th frame, but the present invention is not limited thereto and the number of the data enable signals DE may vary according to the resolution of the display panel. For example, in a display panel having the resolution of 1920*1080, 1080 data enable signals DE configured by 1920 clocks in one frame may be applied.

An image of the n-th frame is displayed on the screen according to the application of the control signals, and the image of the n-th frame is maintained until a signal of the next frame is applied.

Subsequently, the data enable signal DE is applied in the n+1-th frame which is the next frame after the n-th, frame and as a result, the vertical synchronization start signal STV, the gate clock signal CPV, the polarity inversion signal REV, and the load signal TP are applied, respectively.

In this case, the data enable signal DE is not applied during a vertical blank period between the n-th frame and the n+1-th frame. Accordingly, when the vertical blank period is increased as compared with the case in which the display panel is driven at the first frequency, the time in which each of the control signals are not applied increases, thereby reducing power consumption. However, in this case, as a liquid crystal is maintained during the vertical blank period in the same polarity as that of the n-th frame, deterioration of the liquid crystal and the like occur.

Hereinafter, another method of driving the display device is described. In this method, a dummy data enable signal is provided during the vertical blank period between two adjacent frames in order to prevent the deterioration of the liquid crystal.

Figure 9:
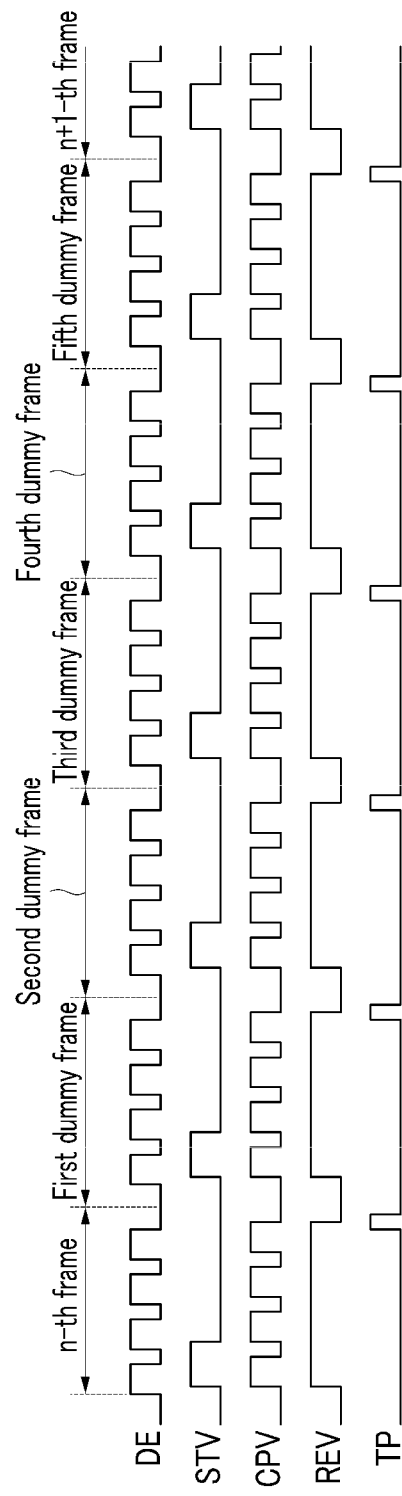
FIG. 9 is a diagram illustrating other control signals of a display device according to an exemplary embodiment of the present invention.

FIG. 9 is a diagram illustrating other control signals of a display device according to an exemplary embodiment of the present invention.

When the display panel is driven at the second frequency, the method of applying the control signals in the n-th frame and the n+1-th frame is the same as described above.

In FIG. 9, the signal controller provides a dummy data enable signal DE in the vertical blank period between the n-th frame and the n+1-th frame. As the dummy data enable signal DE is applied, a vertical synchronization start signal STV, a gate clock signal CPV, a polarity inversion signal REV, and a load signal TP are also applied.

In this case, a dummy data enable signal DE is provided during every frame period of the vertical blank period. That is, the vertical blank period is completely filled by dummy frames. Accordingly, the first dummy frame, the second dummy frame, the third dummy frame, the fourth dummy frame, and the fifth dummy frame are formed between the n-th frame and the n+1-th frame.

Data signals having different polarities are outputted in the n-th frame and the first dummy frame, and polarity is also switched again between the first dummy frame and the second dummy frame. The polarity of the data signal is inverted in each of the dummy frames, thereby preventing deterioration of the liquid crystal. However, in this case, the reduction in power consumption may not be large, due to the number of added dummy data enable signals DE.

Hereinafter, yet another method of driving the display device is described below.

Figure 10:
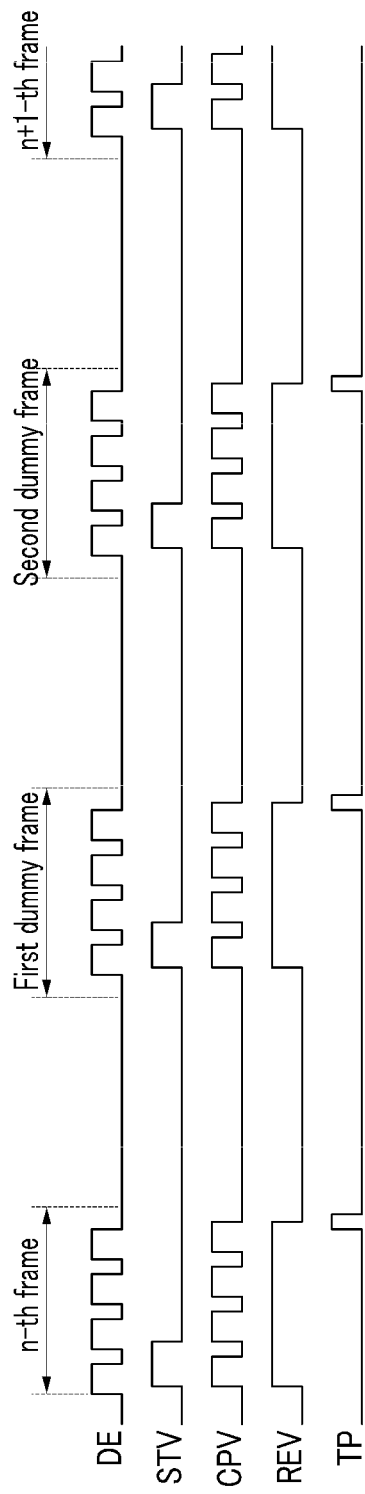
FIG. 10 is a diagram illustrating other control signals of a display device according to an exemplary embodiment of the present invention.

FIG. 10 is a diagram illustrating other control signals of a display device according to an exemplary embodiment of the present invention.

When the display panel is driven at the second frequency, the method of applying the control signals in the n-th frame and the n+1-th frame is the same as described above.

In FIG. 10, the signal controller provides a dummy data enable signal DE in the vertical blank period between the n-th frame and the n+1-th frame. As the dummy data enable signal DE is applied, a vertical synchronization start signal STV, a gate clock signal CPV, a polarity inversion signal REV, and a load signal TP are also applied.

In this case, a dummy data enable signal DE is not provided in every frame period of the vertical blank period. That is, some frame periods within the vertical blank period are left blank. Accordingly, the first dummy frame and the second dummy frame are formed between the n-th frame and the n+1-th frame. Further, between the n-th frame and the n+1-th frame, dummy frames are only applied during every other frame period. That is, every other frame period, a dummy frame is applied, and during the intervening frame periods, no dummy frame is applied.

Data signals having different polarities are outputted in the n-th frame and the first dummy frame, and polarities are also reversed between the first dummy frame and the second dummy frame. Accordingly, the polarity of the data signal is inverted for each dummy frame, thereby preventing deterioration of the liquid crystal. Further, as dummy frames are not applied during some frame periods, power consumption is reduced as compared to the embodiment of FIG. 9.

As described above, two dummy frames are formed between the n-th frame and the n+1-th frame, but the present invention is not limited thereto. Instead, any suitable number of dummy frames may be applied. For example, only one dummy frame may be formed, or three or four dummy frames may be formed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 300: Display panel | 400: Gate driver |
| 500: Data driver | 600: Signal controller |
| 610: Signal receiving unit | 640: Frame memory |
| 650: Driving frequency selecting unit | 700: Graphic processing unit |
| 800: Gray voltage generator | |

What is claimed is:

1. A display device, comprising:
a display panel configured for display of a still image and a motion picture;
a signal controller programmed to transmit control signals for driving the display panel; and
a graphic processing unit transmitting input image data to the signal controller,
wherein the signal controller includes a frame memory storing the input image data, and
wherein the display panel is driven at a first frequency when the motion picture is displayed, and alternatingly driven at the first frequency and a second frequency when the still image is displayed, the second frequency being lower than the first frequency, a length of a second vertical blank period when the display panel is driven at the second frequency is larger than a length of a first vertical blank period when the display panel is driven at the first frequency, the signal controller providing a dummy data enable signal during the second vertical blank period, wherein one of the dummy data enable signals is provided during each frame period of the second vertical blank period.

2. The display device of claim 1, wherein:
the graphic processing unit is programmed to transmit a still image start signal and a still image end signal to the signal controller.

3. The display device of claim 2, wherein:
the signal controller is configured to store the input image data in the frame memory and to interrupt transmission of the input image data to the display panel when the still image start signal is received, and is configured to resume transmission of the input image data when the still image end signal is received.

4. The display device of claim 3, wherein:
the signal controller is configured to output image data stored in the frame memory to the display panel at the first frequency and the second frequency in alternating manner when the still image start signal is received, and to output the input image data to the display panel at the first frequency when the still image end signal is received.

5. The display device of claim 4, wherein the signal controller further includes:
a signal receiving unit for receiving the input image data from the graphic processing unit; and
a driving frequency selecting unit configured to alternately select the first frequency and the second frequency when the still image is displayed, and to select the first frequency when the motion picture is displayed.

6. The display device of claim 1, wherein:
the signal controller is configured to transmit first and second clock signals so as to control a timing of display of images on the display panel, and
when the display panel is driven at the second frequency, the second clock signal has a clock speed lower than that of the first clock signal when the display panel is driven at the first frequency.

7. A display device, comprising:
a display panel configured for display of a still image and a motion picture;
a signal controller programmed to transmit control signals for driving the display panel; and
a graphic processing unit transmitting input image data to the signal controller,
wherein the signal controller includes a frame memory storing the input image data, and
wherein the display panel is driven at a first frequency when the motion picture is displayed, and alternatingly driven at the first frequency and a second frequency when the still image is displayed, the second frequency being lower than the first frequency,
a length of a second vertical blank period when the display panel is driven at the second frequency is larger than a length of a first vertical blank period when the display panel is driven at the first frequency, the signal controller providing a dummy data enable signal during the second vertical blank period, wherein:
the dummy data enable signals are not provided during at least one frame period of the second vertical blank period.

8. A driving method of a display device, comprising:
(a) transmitting input image data to a signal controller from a graphic processing unit;
(b) applying a still image start signal;
(c) driving a display panel at a first frequency and a second frequency in alternating manner;
(d) applying a still image end signal; and
(e) driving the display panel at the first frequency,
wherein the second frequency is lower than the first frequency, wherein:
in (c), a length of a second vertical blank period when the display panel is driven at the second frequency is larger than a length of a first vertical blank period when the display panel is driven at the first frequency and a dummy data enable signal is applied during the second vertical blank period, wherein:
one of the dummy data enable signals is provided during each frame period of the second vertical blank period.

9. The driving method of a display device of claim 8, wherein:
after (a), the input image data is stored in the frame memory and the transmitting is suspended when the still image start signal is applied and,
the transmitting is resumed when the still image end signal is applied.

10. The driving method of a display device of claim 9, wherein:
in (c), the image data stored in the frame memory is output to the display panel at the first frequency and the second frequency in alternating manner once the still image start signal is applied, and
in (e), the input image data is output to the display panel at the first frequency once the still image end signal is applied.

11. The driving method of a display device of claim 10, wherein:
the display panel is configured to display a still image and a motion picture, and
the display panel is driven at the first frequency and the second frequency in alternating manner when the still image is displayed, and is driven at the first frequency when the motion picture is displayed.

12. The driving method of a display device of claim 8, wherein:
in (c), the signal controller is configured to transmit first and second clock signals so as to control a timing of display of images on the display panel, and when the display panel is driven at the second frequency, the second clock siunal has a clock speed lower than that of the first clock signal when the display panel is driven at the first frequency.

13. A driving method of a display device, comprising:
(a) transmitting input image data to a signal controller from a graphic processing unit;
(b) applying a still image start signal;
(c) driving a display panel at a first frequency and a second frequency in alternating manner;
(d) applying a still image end signal; and
(e) driving the display panel at the first frequency, wherein the second frequency is lower than the first frequency, wherein in (c), a length of a second vertical blank period when the display panel is driven at the second frequency is larger than a length of a first vertical blank period when the display panel is driven at the first frequency and a dummy data enable signal is applied during the second vertical blank period, wherein:

the dummy data enable signals are not provided during at least one frame period of the second vertical blank period.

\* \* \* \* \*